United States Patent
Tsymbalenko

(10) Patent No.: US 11,354,791 B2
(45) Date of Patent: Jun. 7, 2022

(54) METHODS AND SYSTEM FOR TRANSFORMING MEDICAL IMAGES INTO DIFFERENT STYLED IMAGES WITH DEEP NEURAL NETWORKS

(71) Applicant: General Electric Company, Schenectady, NY (US)

(72) Inventor: Yelena Viktorovna Tsymbalenko, Mequon, WI (US)

(73) Assignee: General Electric Company, Schenectady, NY (US)

( * ) Notice: Subject to any disclaimer, the term of this patent is extended or adjusted under 35 U.S.C. 154(b) by 344 days.

(21) Appl. No.: 16/225,962

(22) Filed: Dec. 19, 2018

(65) Prior Publication Data

US 2020/0202502 A1 Jun. 25, 2020

(51) Int. Cl.
*G06T 5/50* (2006.01)

(52) U.S. Cl.
CPC ...... *G06T 5/50* (2013.01); *G06T 2207/10132* (2013.01); *G06T 2207/20081* (2013.01); *G06T 2207/20084* (2013.01); *G06T 2207/20212* (2013.01)

(58) Field of Classification Search
CPC ............ G06T 5/50; G06T 2207/10132; G06T 2207/20081; G06T 2207/20084; G06T 2207/20212
See application file for complete search history.

(56) References Cited

U.S. PATENT DOCUMENTS

| | | | |
|---|---|---|---|
| 10,536,164 B2 * | 1/2020 | Gupta | G06N 3/08 |
| 10,635,943 B1 * | 4/2020 | Lebel | G06N 3/084 |
| 2016/0174902 A1 * | 6/2016 | Georgescu | G06T 7/0012 600/408 |
| 2019/0158112 A1 * | 5/2019 | Gupta | G06K 9/4604 |
| 2019/0220977 A1 * | 7/2019 | Zhou | G06T 5/50 |
| 2019/0236782 A1 * | 8/2019 | Amit | A61B 10/0041 |
| 2019/0362226 A1 * | 11/2019 | Richmond | G06K 9/6256 |
| 2019/0362522 A1 * | 11/2019 | Han | G01R 33/4812 |
| 2021/0063518 A1 * | 3/2021 | Zhang | G06K 9/46 |

OTHER PUBLICATIONS

Gatys, L. et al., "A Neural Algorithm of Artistic Style," arXiv Website, Available Online at https://arxiv.org/abs/1508.06576, Aug. 26, 2015, 16 pages.

* cited by examiner

*Primary Examiner* — Shefali D Goradia
(74) *Attorney, Agent, or Firm* — McCoy Russell LLP

(57) ABSTRACT

Various methods and systems are provided for transforming a style of an image into a different style while preserving content of the image. In one example, a method includes transforming a first image acquired via a medical imaging system into a second image based on visual characteristics of a third image using a system of deep neural networks configured to separate visual characteristics from content of an image, where the second image includes a content of the first image and the visual characteristics of the third image and the first and second images have different visual characteristics. The transformed second image may then be presented to a user.

20 Claims, 8 Drawing Sheets

US 11,354,791 B2

METHODS AND SYSTEM FOR TRANSFORMING MEDICAL IMAGES INTO DIFFERENT STYLED IMAGES WITH DEEP NEURAL NETWORKS

FIELD

Embodiments of the subject matter disclosed herein relate to medical imaging, such as ultrasound imaging, and more particularly to applying an image style transfer to acquired medical images.

BACKGROUND

Medical imaging systems are often used to obtain internal physiological information of a subject, such as a patient. For example, a medical imaging system may be used to obtain images of the bone structure, internal organs (e.g., the brain, the heart, the lungs), blood flow through vessels, and various other features of a subject. Medical imaging systems may include magnetic resonance imaging (MRI) systems, computed tomography (CT) systems, x-ray systems, ultrasound systems, and various other imaging modalities.

The images obtained from these different medical imaging systems have a different, discernable style (visual appearance) recognized by different characteristics of the images, including a level of smoothness, texture, edge structure, level of contrast, speckling, resolution, and the like. Further, images acquired by two medical imaging systems of the same type (e.g., both ultrasound systems) but from different manufacturers with different programming and/or components may also produce images with different styles which appear different to a user. In this way, each medical imaging system may be adapted to produce images of a certain style (e.g., certain look with discernable features) based on pre-determined programming of the system.

BRIEF DESCRIPTION

In one embodiment, a method comprises transforming a first image acquired via a medical imaging system into a second image based on visual characteristics of a third image using a system of deep neural networks configured to separate visual characteristics from content of an image, where the second image includes a content of the first image and the visual characteristics of the third image and the first and second images have different visual characteristics; and presenting the transformed second image to a user.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 2:
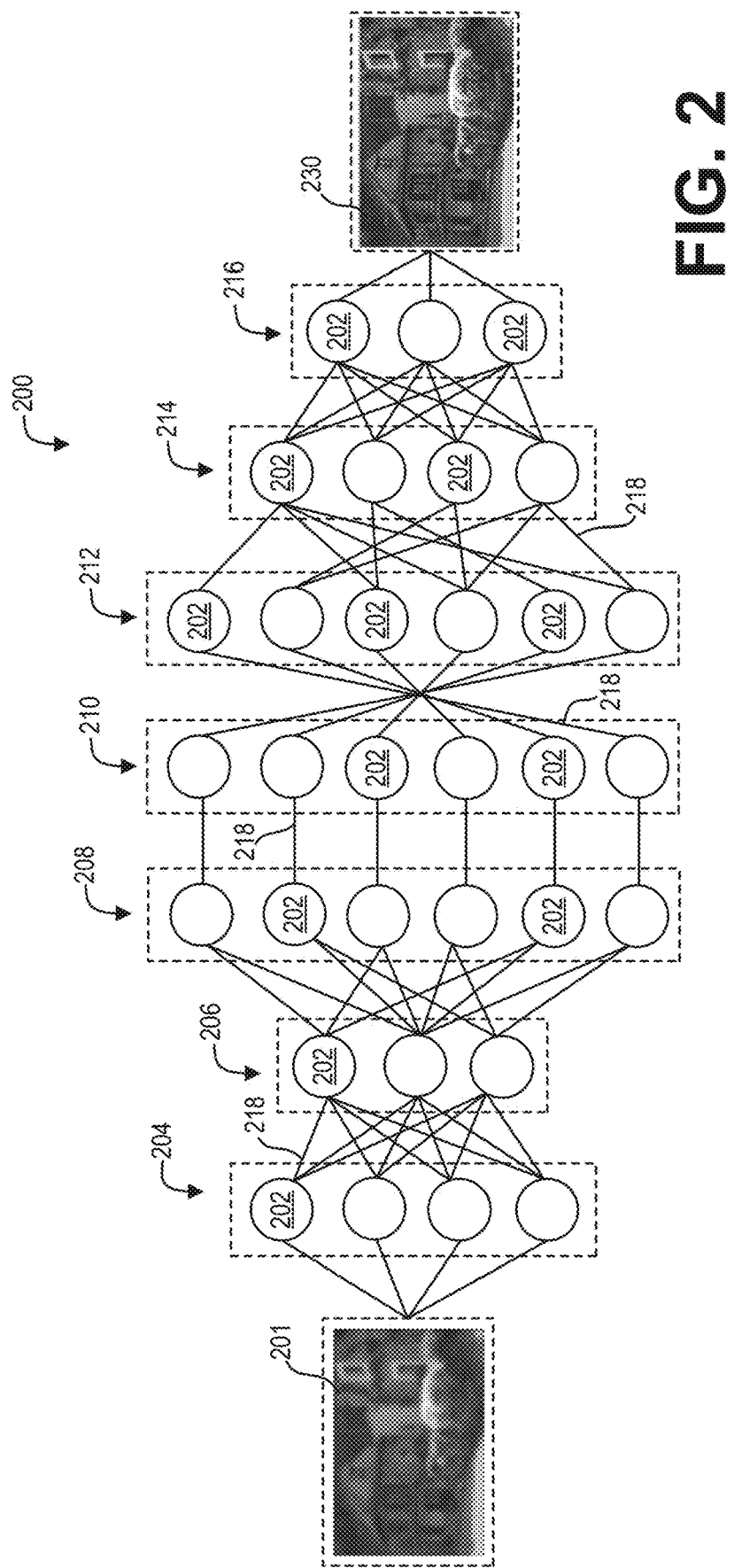
FIG. 2 shows a schematic diagram illustrating an example neural network, according to an embodiment.
Figure 3:
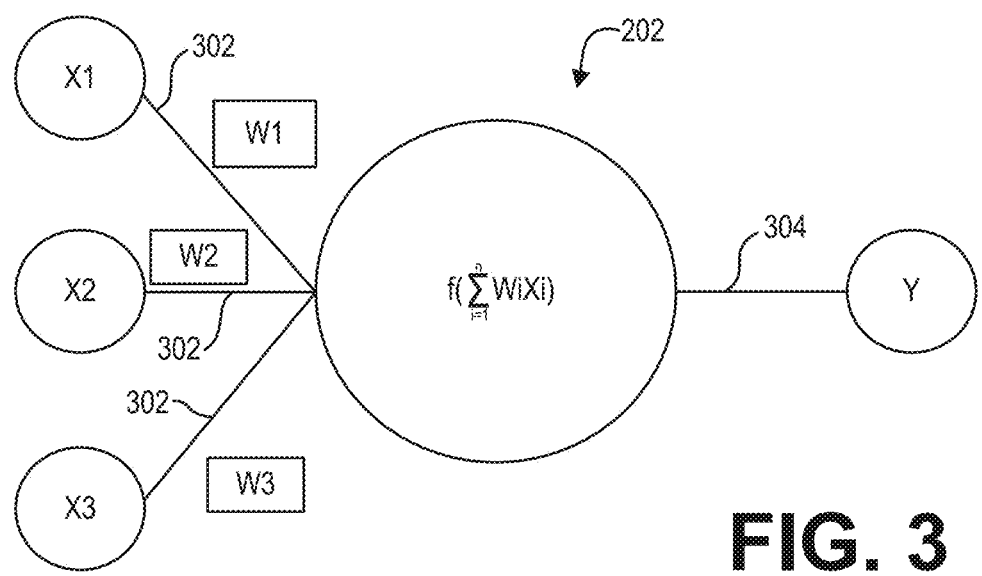
FIG. 3 shows a schematic diagram illustrating an example node of a neural network, according to an embodiment.
Figure 4:
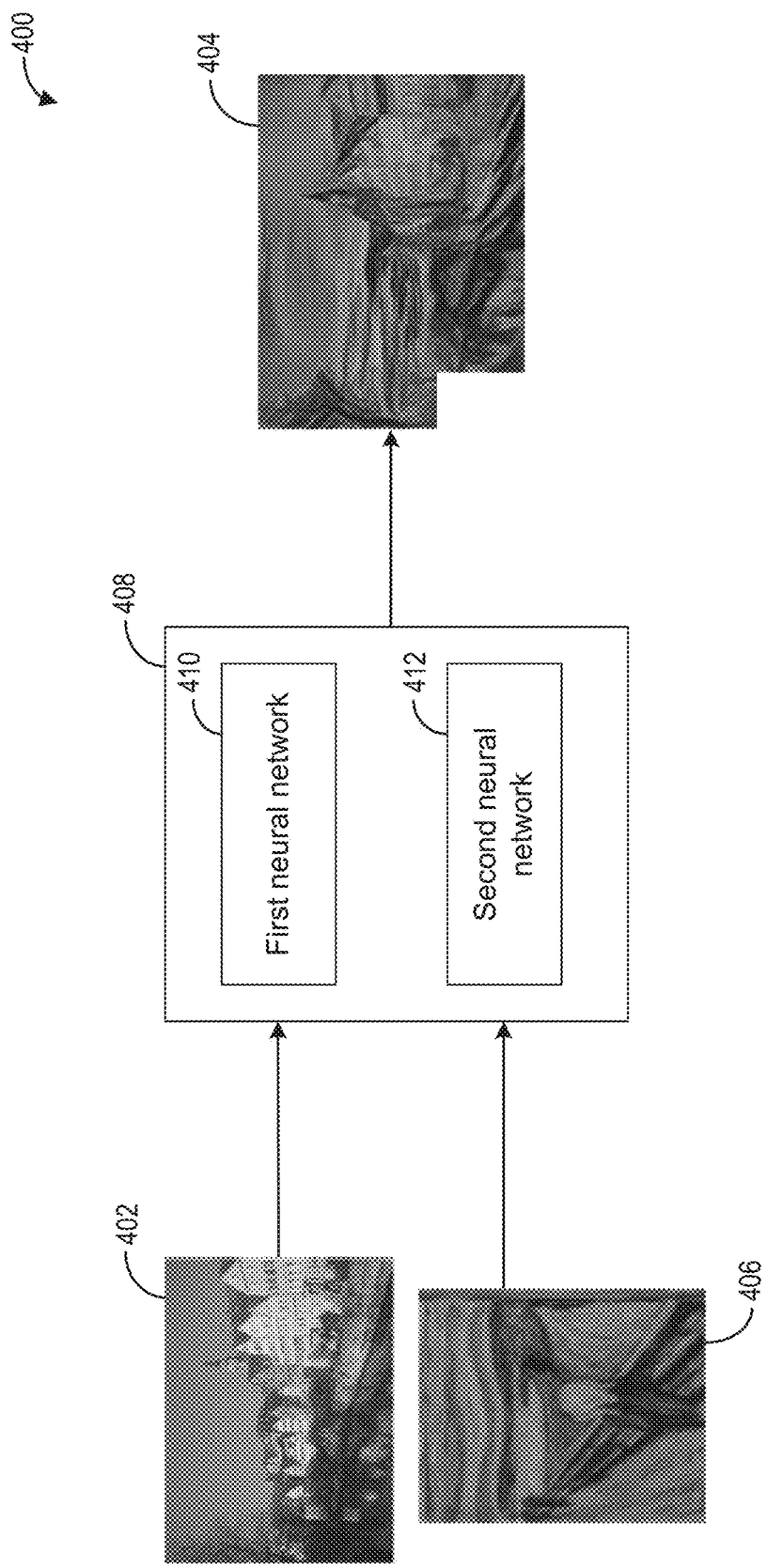
FIG. 4 shows a schematic diagram illustrating an example image-processing system for converting an image into a different style, according to an embodiment.
Figure 5:
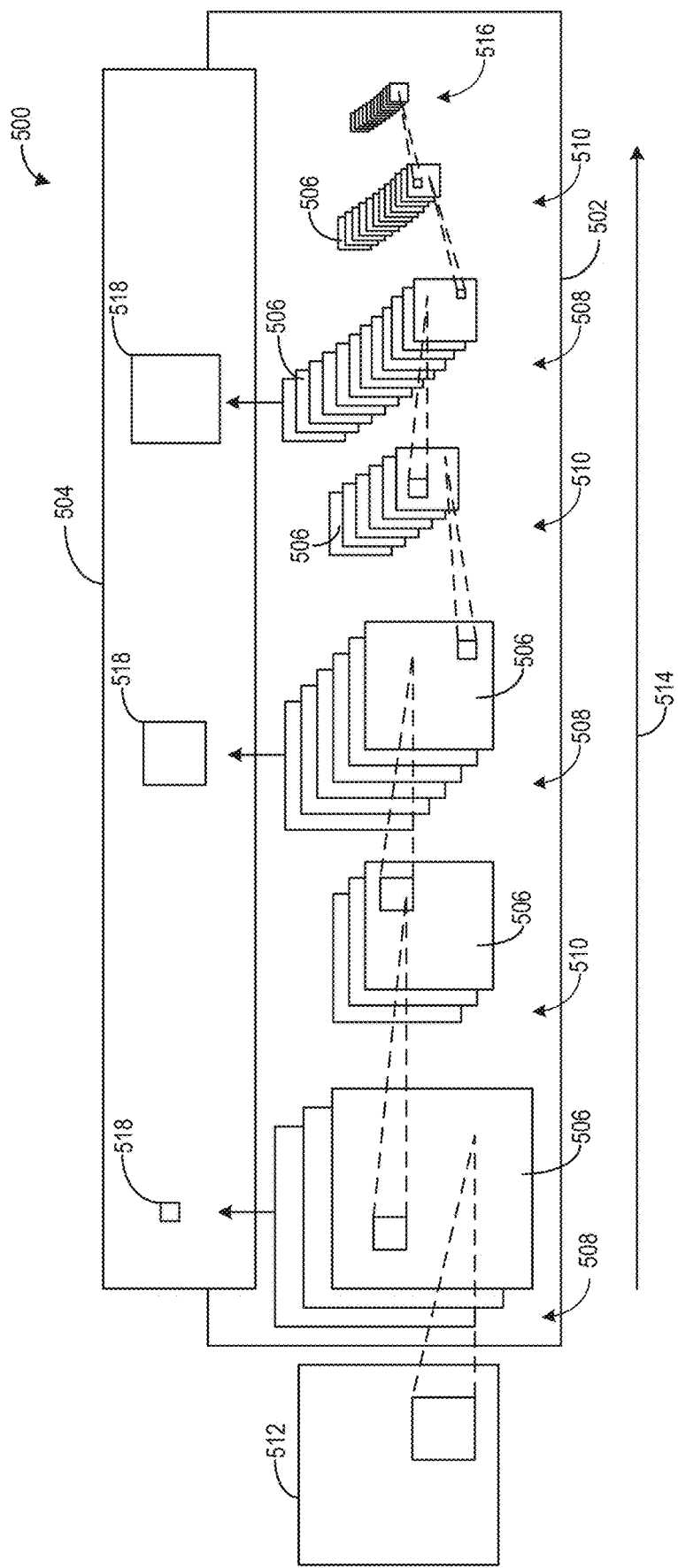
FIG. 5 shows a schematic diagram illustrating an example neural network system used for transforming an initial image into the style of a target image, according to an embodiment.

The following description relates to various embodiments of transforming a style of an initial image into a different style while preserving the content of the initial image. As used herein, "style" refers to the visual appearance and characteristics of the image which are pre-determined by the image processing programming and/or imaging modality (e.g., type such as MRI, CT, x-ray, ultrasound, and the like) of an imaging system used to generate the initial image. An example imaging system, which may be a medical imaging system used to acquire imaging data of a patient and generate a corresponding image using the acquired imaging data, is shown. The imaging system may include a controller used to process acquired imaging data, generate the images from the acquired imaging data, and display the generated images to a user. The controller may configured with a deep neural network system for transforming a style (e.g., visual appearance) of an image generated from imaging data acquired via the imaging system into a different style (e.g., a style of a different imaging system or different imaging modality). In some embodiments, the deep neural network system may be implemented on an edge device connected to the controller or remotely via a device in electronic communication with the controller. Example neural networks and neural network systems are shown in FIGS. 2-3 and 5. By inputting an initial image (e.g., an image generated from data acquired with a first imaging system) and an example image having a desired style (e.g., an image generated from data acquired with a different, second imaging system of a same or different imaging modality) into the neural network system, the content and style of the two input images may be separated and synthesized via the neural network system to output a target image that preserves the content of the initial image while having the style of the example image, as shown by the example image processing system of FIG. 4 and the method of FIG. 6. A user may select the example image from a plurality of example images displayed via a user interface display, as shown by the example presented at FIG. 7. Further, the output image may be displayed to the user via another user interface display, as shown by the example presented at FIG. 8. In some embodiments, the method for transforming the style of an image may be used to acquire image sets that are then used to train a deep neural network that may be utilized for obtaining medical images of higher resolution or with reduced noise. In this way, by utilizing a deep neural network system to transform the style of an initial image acquired with an imaging system into a different style, a user may obtain an image in a desired style without having to reprogram the imaging system and while maintaining the physiological content of the original image, thereby allowing the user to make a more accurate diagnosis based on the transformed image.

Figure 1:
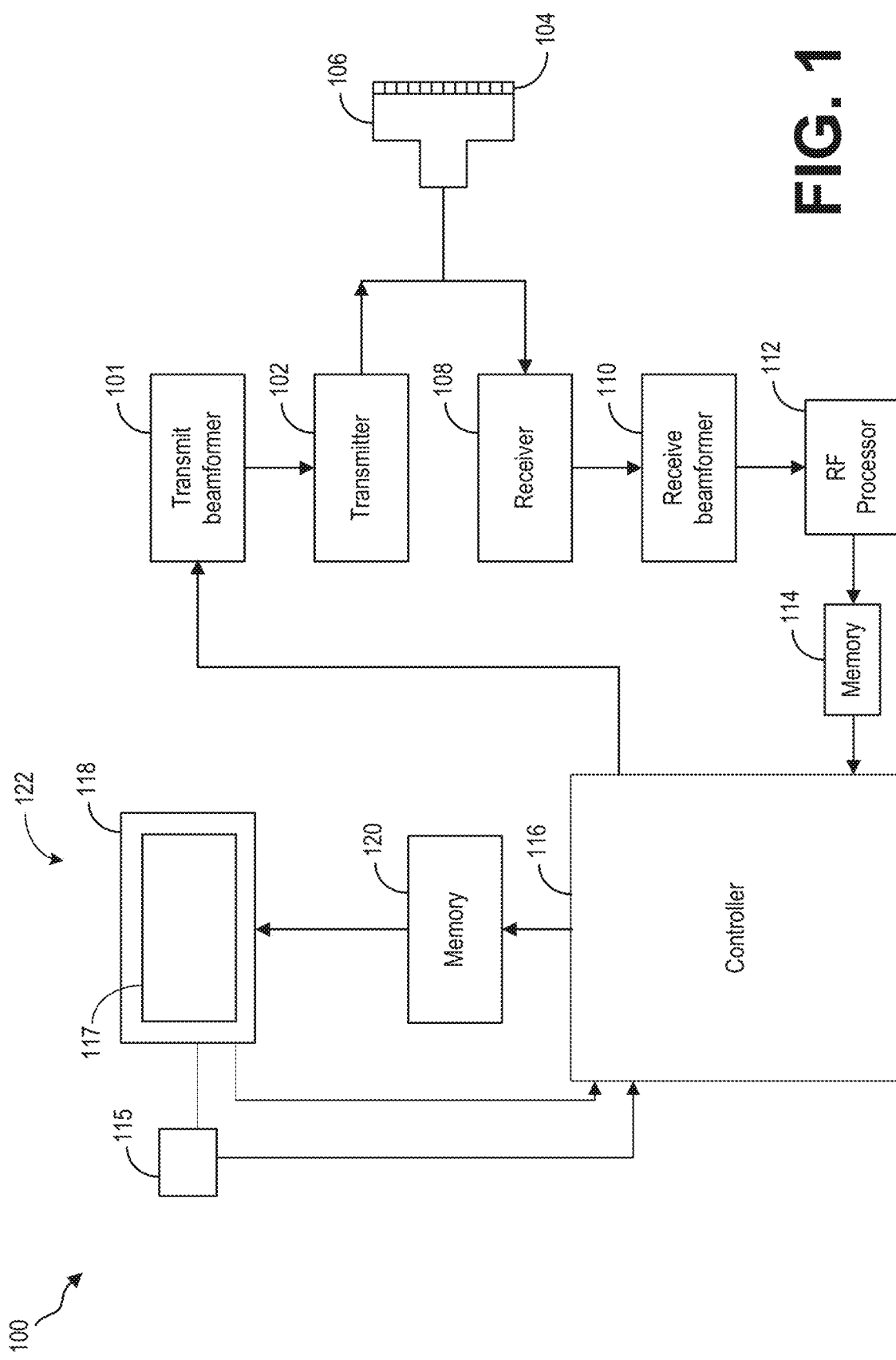
FIG. 1 shows an example ultrasound imaging system, according to an exemplary embodiment.

FIG. 1 illustrates a block diagram of a system 100 according to one embodiment. In the illustrated embodiment, the system 100 is an imaging system and, more specifically, an ultrasound imaging system. However, it is understood that embodiments set forth herein may be implemented using other types of medical imaging modalities (e.g., MR, CT, PET/CT, SPECT etc.). Furthermore, it is understood that other embodiments do not actively acquire medical images. Instead, embodiments may retrieve image or ultrasound data that was previously acquired by an imaging system and analyze the image data as set forth herein. As shown, the system 100 includes multiple components. The components may be coupled to one another to form a single structure, may be separate but located within a common room, or may be remotely located with respect to one another. For example, one or more of the modules described herein may operate in a data server that has a distinct and remote location with respect to other components of the system 100, such as a probe and user interface. Optionally, in the case of ultrasound systems, the system 100 may be a unitary system that is capable of being moved (e.g., portably) from room to room. For example, the system 100 may include wheels or be transported on a cart.

In the illustrated embodiment, the system 100 includes a transmit beamformer 101 and transmitter 102 that drives an array of elements 104, for example, piezoelectric crystals, within a diagnostic ultrasound probe 106 (or transducer) to emit ultrasonic signals (e.g., continuous or pulsed) into a body or volume (not shown) of a subject. The elements 104 and the probe 106 may have a variety of geometries. The ultrasonic signals are back-scattered from structures in the body, for example, blood vessels and surrounding tissue, to produce echoes that return to the elements 104. The echoes are received by a receiver 108. The received echoes are provided to a receive beamformer 110 that performs beamforming and outputs an RF signal. The RF signal is then provided to an RF processor 112 that processes the RF signal. Alternatively, the RF processor 112 may include a complex demodulator (not shown) that demodulates the RF signal to form IQ data pairs representative of the echo signals. The RF or IQ signal data may then be provided directly to a memory 114 for storage (for example, temporary storage). The system 100 also includes a system controller 116 that may be part of a single processing unit (e.g., processor) or distributed across multiple processing units. The system controller 116 is configured to control operation of the system 100.

For example, the system controller 116 may include an image-processing module that receives image data (e.g., ultrasound signals in the form of RF signal data or IQ data pairs) and processes image data. For example, the image-processing module may process the ultrasound signals to generate slices or frames of ultrasound information (e.g., ultrasound images) or ultrasound waveforms (e.g., continuous or pulse wave Doppler spectrum or waveforms) for displaying to the operator. When the system 100 is an ultrasound system, the image-processing module may be configured to perform one or more processing operations according to a plurality of selectable ultrasound modalities on the acquired ultrasound information. By way of example only, the ultrasound modalities may include color-flow, acoustic radiation force imaging (ARFI), B-mode, A-mode, M-mode, spectral Doppler, acoustic streaming, tissue Doppler module, C-scan, and elastography.

Acquired ultrasound information may be processed in real-time during an imaging session (or scanning session) as the echo signals are received. Additionally or alternatively, the ultrasound information may be stored temporarily in the memory 114 during an imaging session and processed in less than real-time in a live or off-line operation. An image memory 120 is included for storing processed slices or waveforms of acquired ultrasound information that are not scheduled to be displayed immediately. The image memory 120 may comprise any known data storage medium, for example, a permanent storage medium, removable storage medium, and the like. Additionally, the image memory 120 may be a non-transitory storage medium.

In operation, an ultrasound system may acquire data, for example, 2D data sets, spectral Doppler data sets, and/or volumetric data sets by various techniques (for example, 3D scanning, real-time 3D imaging, volume scanning, 2D scanning with probes having positioning sensors, freehand scanning using a voxel correlation technique, scanning using 2D or matrix array probes, and the like). Ultrasound spectrum (e.g., waveforms) and/or images may be generated from the acquired data (at the controller 116) and displayed to the operator or user on the display device 118.

The system controller 116 is operably connected to a user interface 122 that enables an operator to control at least some of the operations of the system 100. The user interface 122 may include hardware, firmware, software, or a combination thereof that enables an individual (e.g., an operator) to directly or indirectly control operation of the system 100 and the various components thereof. As shown, the user interface 122 includes a display device 118 having a display area 117. In some embodiments, the user interface 122 may also include one or more user interface input devices 115, such as a physical keyboard, mouse, and/or touchpad. In one embodiment, a touchpad may be configured to the system controller 116 and display area 117, such that when a user moves a finger/glove/stylus across the face of the touchpad, a cursor atop the ultrasound image or Doppler spectrum on the display device 117 moves in a corresponding manner.

In an exemplary embodiment, the display device 118 is a touch-sensitive display (e.g., touchscreen) that can detect a presence of a touch from the operator on the display area 117 and can also identify a location of the touch in the display area 117. The touch may be applied by, for example, at least one of an individual's hand, glove, stylus, or the like. As such, the touch-sensitive display may also be characterized as an input device that is configured to receive inputs from the operator. The display device 118 also communicates information from the controller 116 to the operator by displaying the information to the operator. The display device 118 and/or the user interface 122 may also communicative audibly. The display device 118 is configured to present information to the operator during or after the imaging or data acquiring session. The information presented may include ultrasound images, selectable images for designating a desired image style (as described further below), graphical elements, measurement graphics of the displayed images, user-selectable elements, user settings, and other information (e.g., administrative information, personal information of the patient, and the like).

In addition to the image-processing module, the system controller 116 may also include one or more of a graphics module, an initialization module, a tracking module, and an analysis module. The image-processing module, the graphics module, the initialization module, the tracking module, and/or the analysis module may coordinate with one another to present information to the operator during and/or after the imaging session. For example, the image-processing module may be configured to display an acquired image on the display device 118, and the graphics module may be configured to display designated graphics along with the displayed image, such as selectable icons and measurement parameters (e.g., data) relating to the image. The controller may include algorithms and one or more neural networks (e.g., a system of neural networks) stored within a memory of the controller for transforming an acquired ultrasound image (or retrieved, initial image) into an image that preserves the physiological content of the acquired image but has a different, desired style (e.g., appearance), such as that of a different imaging modality (e.g., MM, CT, or the like) or a stylistically different ultrasound image appearance, as described further below with reference to FIGS. 2-7. In some examples, the controller may include a deep learning module which includes the one or more deep neural networks and instructions for performing the deep learning and image style transfer discussed herein.

The screen of the display area 117 of the display device 118 is made up of a series of pixels which display the data acquired with the probe 106. The acquired data includes one or more imaging parameters calculated for each pixel, or group of pixels (for example, a group of pixels assigned the same parameter value), of the display, where the one or more calculated image parameters includes one or more of an intensity, velocity (e.g., blood flow velocity), color flow velocity, texture, graininess, contractility, deformation, and rate of deformation value. The series of pixels then make up the displayed image and/or Doppler spectrum generated from the acquired ultrasound data.

The system 100 may be a medical ultrasound system used to acquire image data of a scanned object (e.g., tissue). The acquired image data may be used to generate an ultrasound image which may then be displayed via the display device 118 of the user interface 122. The generated ultrasound image may have a designated style that is pre-determined based on the programming and configuration of system 100. For example, the image-processing module discussed above may be programmed to generate and display an image having a certain style from acquired image data. Though different acquired images (with the same system) may have different physiological content (e.g., show different tissue structures or views), all of the images produced by the same image-processing module of system 100 may have the same style (e.g., appearance).

As used herein, the "style" of the image may refer to a visual appearance of the displayed image. The style of the image may be defined by different visual characteristics of the images, such as a level of smoothness, texture, maps, image boundary, edges (e.g., how smooth and prolonged edges on an anatomical structure are), a level of contrast, a noise level, an amount/level of speckle, a resolution level (e.g., low or high), and the like. These visual characteristics may be specific to the imaging modality and the hardware and software of the imaging system used to acquire the image. For example, each imaging system may have pre-defined levels (which may be quantified, in one example) for one or more of the above characteristics and the image-processing module of the imaging system may be configured (e.g., pre-programmed) to produce an image with the same, pre-set (visual) characteristics each time an image is acquired. As a result, a user may recognize the style of images generated and displayed by the system. Thus, different systems (e.g., different ultrasound imaging systems manufactured by different companies) may have different pre-defined and pre-programmed imaging characteristics and thus the resulting images displayed by those systems may have a different style (e.g., visual appearance). For example, some imaging systems may be higher or lower resolution (due to the type of transducer being used to acquire image data, in one example) and the resulting images may look different due to the resolution difference. Additionally, different imaging modalities (e.g., MM, ultrasound, CT, x-ray, and the like) have different characteristics that can be recognized in the displayed images, some of which are inherent or unique to the specific imaging modality. For example, ultrasound images have speckle, which is a granular noise that inherently exists in and affects the quality of ultrasound images. For example, speckle, which presents in the ultrasound image as bright and dark dots, is primarily due to the interference of the returning ultrasound sound waves at the ultrasound transducer aperture. However, since MM (which utilizes a magnetic field and radio waves) and x-ray or CT (which use x-rays) do not utilize sound waves (produced by ultrasound transducers), as in ultrasound imaging, the resulting images from these imaging modalities would not include the visible effects of speckling noise (e.g., the bright and dark dots in the generated and displayed image). Thus, if a user saw speckle effects in an image, they may identify the image as an ultrasound image and not a MM or CT image. As another example, the level of contrast in the images generated from a MM system may be higher than images generated from an ultrasound system. The level of contrast in a medical image may be discernable by the user and allow the user to identify an MRI image from an ultrasound image.

Visual characteristics, which make up and define the style, of a medical imaging image may be inherent to the type of imaging modality (MM, x-ray, CT, ultrasound, and the like) due to the type of energy being using to perform the imaging scan (e.g., ultrasound waves vs. x-rays vs. magnetic fields). As explained above, these characteristics that determine the image style may also be due to pre-programmed settings in the image-processing module of the system. Thus, since many or all of the visual characteristics of the generated and displayed medical image may be pre-determined or inherent to the type of imaging modality or the specific imaging system being used to acquire the image, it is not possible to easily change the appearance or style of the resulting image. For example, changing the style of the image displayed to the user may require extensive re-programming of the imaging system. In other cases, transforming the style of an image from a first imaging modality (e.g., ultrasound) to the style of an image from a second imaging modality (e.g., MM) may not be possible at all using the system of the first imaging modality since the characteristics that make up the style of the image generated by that system are inherent to the energy, waves, and technology used in the system of the specific imaging modality. For example, an ultrasound imaging system may not generate images that have the appearance of MM images since the ultrasound system does not use magnetic fields and the same technology as in MM, and thus, cannot generate images with the same characteristics as MM generated images, such as images having the same amount of contrast.

In different situations, a user may desire the image generated and displayed by a first medical imaging system (e.g., an ultrasound system, such as ultrasound system 100 shown in FIG. 1) to have a different style (e.g., visual appearance, as described above) than what is pre-determined and pre-set by the system (e.g., due to programming and characteristics that are inherent to the imaging modality). For example, a user may desire the generated and displayed image from the first medical imaging system to have a style of an image produced by a different, second medical imaging system. The second medical imaging system may be a different make and/or model or a different imaging modality (e.g., MM, CT, or x-ray). As an example, a patient suffering from cancer, may have a series of previously acquired CT images of a certain portion of their body. However, due to their condition, they may not be able to be exposed to further radiation from the CT imaging system. Thus, there may be a desire to capture a similar image of the same portion of their body using a different imaging modality that does not utilize radiation (e.g., ultrasound). However, in order to accurately compare the new, ultrasound image with the previous, CT images, and make an informed diagnosis, the ultrasound image may need to resemble (e.g., be visually similar to) the CT images. Currently, there is no way to easily and cost-effectively transform an ultrasound image to have the appearance (e.g., style) of a CT image for this purpose.

The inventors of the subject application have recognized these problems and developed systems and methods to at least partially address them. As one example, as introduced above, the imaging system 100 (e.g., ultrasound system) may be configured with a deep neural network system for transforming a style (e.g., visual appearance) of an image generated from imaging data acquired via the imaging system 100 into a different style (e.g., a style of a different imaging system or different imaging modality). In some embodiments, the deep neural network system may be implemented on an edge device (not shown) connected to the system 100. In some embodiments, the deep neural network system may be implemented remotely, for example in a cloud in communication with the system 100. In some embodiments, portions of the deep neural network system are implemented on different devices, such as any appropriate combination of the system 100, the edge device, the cloud, etc. The deep neural network system may include a system of multiple neural networks, such as a system of two neural networks, as described further below.

As an illustrative example, FIG. 2 depicts a neural network 200 having one or more nodes/neurons 202 which, in some embodiments, may be disposed into one or more layers 204, 206, 208, 210, 212, 214, and 216. The neural network 200 may be a deep neural network. As used herein with respect to neurons, the term "layer" refers to a collection of simulated neurons that have inputs and/or outputs connected in similar fashion to other collections of simulated neurons. Accordingly, as shown in FIG. 2, the neurons 202 may be connected to each other via one or more connections 218 such that data may propagate from an input layer 204, through one or more intermediate layers 206, 208, 210, 212, 214 to an output layer 216.

FIG. 3 shows input and output connections for a neuron in accordance with an exemplary embodiment. As shown in FIG. 3, the connections 218 of an individual neuron 202 may include one or more input connections 302 and one or more output connections 304. Each input connection 302 of a neuron 202 may be an output connection of a preceding neuron, and the output connections 304 of the neuron 202 may be an input connection of one or more subsequent neurons. While FIG. 3 depicts a neuron 202 as having a single output connection 304 and three input connections 302, it should be understood that neurons may have multiple output connections that transmit/pass the same value and/or may have less than three (e.g., only one, in some examples) input connections 302. In one embodiment, the neurons 202 may be data constructs, e.g., structures, instantiated class objects, matrices, etc., and the input connections 218 may be received by the neuron 202 as weighted numerical values, e.g., floating point or integer values. For example, as further shown in FIG. 3, input connections X1, X2, and X3 may be weighted via weights W1, W2, and W3, respectively, summed, and sent/transmitted/passed as output connection Y. As will be appreciated, the processing of an individual neuron 202 may be represented, generally, by the equation:

$$Y = f\left(\sum_{i=1}^{n} WiXi\right)$$

where n is the total number of input connections 302 to the neuron 202. In embodiment, the value of Y may be based at least in part on whether the summation of WiXi exceeds a threshold. For example, Y may have a value of zero (0) if the summation of the weighted inputs fails to exceed a desired threshold.

As will be further understood, the input connections 302 of neurons 202 in the input layer 204 may be mapped to the input 201, while the output connections 302 of the neurons 202 in the output layer 216 may be mapped to the output 230. As used herein, "mapping" an input connection 302 to the input 201 refers to the manner by which the input 201 affects/dictates the value of the input connections 302. Similarly, as also used herein, "mapping" an output connection 302 to the output 230 refers to the manner by which the value of the output connections 302 affects the output 230.

Accordingly, in embodiments, the acquired/obtained input 201 is passed/fed to the input layer 204 of the neural network 200 and propagated through the layers 204, 206, 208, 210, 212, 214, and 216 such that mapped output connections 304 of the output layer 216 generates/corresponds to the output 230.

In some embodiments, the deep neural network 200 may be trained using pairs of a first image not acquired via a medical imaging apparatus (e.g., a photographic image) and a second image having a format and visual characteristics specific to an image acquired via the medical imaging apparatus, such as an ultrasound system (e.g., system 100 shown in FIG. 1), where the first image is converted into the style of the second image using the technique and deep neural network system described herein with reference to FIGS. 4-8. Following the learning, the deep neural network 200 may then be used to convert medical images from lower resolution to higher resolution. For example, a lower resolution, acquired ultrasound image may be input to the deep neural network 200, which in turn outputs a higher resolution ultrasound image that maintains the content of the lower resolution image, but may be now easier to use for diagnosis. In one example, digital photographs of various contents (e.g., non-medical contents such as houses, vehicles, landscapes, animals, plants, and medical contents such as pathology slides and anatomical structures) may be used to train the deep neural network 200 to obtain higher resolution medical imaging images without having more complex and expensive processing in the imaging system itself.

As explained above, in one embodiment, a system of one or more neural networks may be employed to transform a first image (which may be acquired by an imaging system, such as system 100 of FIG. 1) into a different, desired image style while still preserving the physiological content of the first image. An example of such a neural network system, which may be employed in conjunction with or as part of an imaging system, is shown in FIG. 4. In particular, FIG. 4 shows an example image-processing system 400 for converting a first image 402 into a second image 404, based on third image 406 that has a desired style, the second image 404 having the content of the first image 402 and style of the third image 406. As shown in FIG. 4, the first image 402 and the third image 406 are each input into the neural network system 408. In one embodiment, the first image 402 may be acquired with a medical imaging system, such as system 100 of FIG. 1 (which may be an ultrasound system, in one embodiment). The third image 406 may be an example image having a different style (e.g., different visual appearance, as described above) than the first image 402. As an example, the third image 406 may be an MRI image, CT image, or x-ray image while the first image 402 is an ultrasound image. In another example, the first image 402 may be an ultrasound image generated from data acquired by a first ultrasound system and the third image 406 may be an ultrasound image generated from data acquired by a second ultrasound system, the second ultrasound system having different programming and/or image processing settings that the first ultrasound system.

The neural network system 408 includes a first neural network 410 and second neural network 412. In one example, one or both of the first neural network 410 and second neural network 412 may be similar to neural network 200 of FIG. 2. Additionally or alternatively, one or both of the first neural network 410 and second neural network 412 may be a convolutional neural network, such as the convolutional neural network shown in FIG. 5, discussed further below. As an example, the first neural network 410 may capture the content (e.g., physiological content/details) of the first image 402 while the second neural network 412 captures the style (e.g., visual appearance and style characteristics) of the third image 406, into which the first image 402 is desired to be transferred. By converging these two networks and/or synthesizing the outputs of the two networks, within the neural network system 408, the output, second image 404 may contain the content of the first image 402 while having the style (e.g., appearance) of the third image 406.

For exemplary purposes only, the images shown in FIG. 4 are photographic and artistic images. Specifically, first image 402 is a photograph and the third image 406 is a well-known artwork. When these two images are input into the neural network system 408, the images are synthesized by the network which finds an image (output as second image 404) that simultaneously matches the content representation of the first image 402 and the style representation of the third image 406. As shown in FIG. 4, while the global arrangement of the first image 402 is persevered in second image 404, the colors and local structures that compose the global scenery are provided by the third image 406. In this way, the output, second image 404 is a rendering of the first image 402 in the style of the third image 406, such that the appearance of the synthesized, second image 404 resembles the second image 406, even though it shows the same content as the first image 402.

In actual application in the medical imaging field, as discussed further below, the first image 402 may be either an initial image acquired via a medical imaging modality or a photographic image used for deep learning, as discussed above. Further, the third image 406 may be an example image, in the desired image style, acquired via a different medical imaging modality than the first image, or acquired via a different medical imaging system than the system used to generate the first image 402. In embodiments where the original, first image 402 is an image not acquired with a medical imaging system (e.g., photographic image), the style image (third image 406) would then be represented by an example ultrasound image (or alternate imaging modality image).

In a first embodiment, the first neural network 410 is a generator and the second neural network 412 is a discriminator, forming a generative adversarial network (GAN). In such a network system, the discriminator classifies input data (e.g., it predicts a label or category to which the input data belongs) by mapping features of the input data to labels while the generator predicts features of a certain label. Said another way, the generator generates "candidates" while the discriminator evaluates them. In some examples, the generator is a deconvolutional neural network and the discriminator is a convolutional neural network. In the application of image style transfer discussed herein, the neural network system 408 may start with a white noise image and try to match the content and style of the first image 402 and third image 406, respectively, using the discriminator and generator neural networks 412 and 410.

In a second embodiment, the first neural network 410 is a convolutional neural network used for image detection (e.g., object recognition) and the second neural network 412 is built on top of the first neural network 410 and based on style. The second neural network 412 forms correlations between the different layers (and filters) of the first neural network 410, over the spatial extent of the feature maps of the convolutional neural network (as discussed further below). By including feature correlations of multiple layers, a stationary, multi-scale representation of the input, third image 406, which captures the texture information but not the global arrangement, is obtained. In this way, the first neural network may represent the content of the first image 402 while the second neural network represents the style (e.g., visual appearance) of the third image 406. By synthesizing the outputs of the first and second neural networks, the resulting image (second image 404) contains both the content of the first image 402 and the style of the third image 406.

FIG. 5 shows an example neural network system 500 used for transforming an initial image into the style of a target image. The neural network system 500 may be used as the neural network system 408 in FIG. 4 and may be included in a controller of an imaging system (e.g., controller 116 of system 100 of FIG. 1) and/or in a system in electronic communication with the controller of the imaging system (or receiving data from the controller of the imaging system). The neural network system 500 includes a convolutional neural network 502 and a second neural network 504 built on top of the layers of the convolutional neural network 502. Convolutional neural networks are a class of biologically inspired deep neural networks that are powerful in image processing tasks. In particular, convolutional neural networks are modeled after the visual system of the brain. Unlike the traditional neural network 200 of FIG. 2, convolutional neural networks consist of layers organized in three dimensions and neurons in one layer connect to only a small region of the next layer (instead of connecting to all neurons).

As shown in FIG. 5, the convolutional neural network 502 consists of layers of computational units that process visual information hierarchically in a feed-forward manner. The output of each layer includes a plurality of feature maps 506 which may be understood as differently filtered versions of the input image. For example, the neural network 502 includes a plurality of convolutional layers 508 and pooling layers 510. Though the convolutional layers 508 and pooling layers 510 are shown in an alternating pattern in FIG. 5, in alternate embodiments, there may be more or less convolutional layers and/or more or less pooling layers and the number of convolutional layers and pooling layers may not be equal. An input image 512 is input into the convolutional neural network 502. The input image 512, and each image of the feature maps 506, may be represented as a matrix of pixel values. This is the data that is used by the neural network system 500. Though a single input image 512 is shown in FIG. 5, as described herein, two different input images may be input into the neural network system 500.

Convolution occurs at each of the convolutional layers 508. Convolution is performed in order to extract features from the input image 512 (or the feature maps 506 in higher layers further along in the processing hierarchy). Convolution preserves the spatial relationship between pixels by learning image features using small squares of input data. Each convolutional layer 508 includes a collection of image filters, each of which extracts a certain feature from the input image. The output of each convolutional layer 508 includes a plurality of feature maps 506, each being a differently filtered version of the input image (and there is one resulting feature map 506 per applied filter).

Pooling (e.g., spatial pooling, which may be max pooling in one example) occurs at each of the pooling layers 510. Pooling is performed in order to reduce the dimensionality (e.g., size) of each feature map 506 while retaining the most important information. By pooling, the number of parameters and computations in the neural network is reduced, thereby controlling overfitting.

As shown in FIG. 5, following the first convolution, there are three feature maps produced (however, it should be noted that this number may be representative and there may be greater than three feature maps in the first convolutional layer 508). Following the first pooling operation, the size of each feature map 506 is reduced, but the number of feature maps is preserved. Then, during the second convolution, a larger a number of filters may be applied and the output is a greater number of feature maps 506 in the second convolutional layer 508. The later layers along the processing hierarchy, shown by directional arrow 514, may be referred to as "higher" layers. The first few layers of the processing hierarchy detect larger features while the later (higher) layers pick up finer details and organize them into more complex features. In some embodiments, the final output layer 516 is fully connected (e.g., all neurons in that layer are connected to all neurons in the previous layer). However, in other embodiments, the convolutional neural network 502 may not include the fully connected final output layer 516.

By training the convolutional neural network 502 on object recognition, it develops a representation of the input image 512 that make object information increasingly explicit along the processing hierarchy, as shown by arrow 514. Thus, along the processing hierarchy of the convolutional neural network 502, the input image 512 is transformed into representations that increasingly emphasize the actual content of the input image 512 compared to its detailed pixel values. Images reconstructed from the feature maps 506 of higher layers in the network capture the high-level content in terms of objects and their arrangement in the input image 512 but do not constrain the exact pixel values of the content reconstructions. In contrast, image reconstructions from the lower layers may reproduce the exact pixel values of the original input image 512. Thus, feature responses in the higher (e.g., deeper) layers of the network may be referred to as the content representation.

To obtain a representation of the style of the input image 512, a feature space, or second neural network, 504 is built on top of the filter responses in each layer of the convolutional neural network 502. The feature space 504 consists of correlations between the different filter responses over the spatial extent of the feature maps 506. In particular, the feature space 504 computes correlations between the different features in the different layers of the convolutional neural network 502. The style of the input image 512 is reconstructed from style representations 518 built on different subsets of the convolutional neural network 502 layers. This process creates images that match the style (e.g., visual appearance) of the input image 512 on an increasing scale while discarding information on the global arrangement of the input image 512. Reconstructions from the style feature space 504 may produce "texturized" versions of the input image 512 that capture its general appearance in terms of color and localized structures, referred to herein as "style".

The representations of content and style in the neural network system 500 are separable. As explained further below with reference to FIG. 6, by synthesizing the outputs of the convolutional neural network 502 and feature space 504, an image that simultaneously matches the content representation of a first input image and the style representation of a second input image may be found. As shown in FIG. 4, the image output from the system 408 (image 404) may preserve the global arrangement of the first image 402 while including the colors (or greyscale) and local structures of the third image 406. Thus, this renders the output, second image 404 in the style of the third image 406, such that the second image 404 resembles the third image 406, even though the second image 404 shows the same content as the first image 402.

The artificial neural network systems described herein, such as system 408 shown in FIG. 4 and/or system 500 shown in FIG. 5, achieve a separation of image content from style, thereby allowing the system to recast the content of a first image (e.g., an initial image acquired via a first imaging modality, such as an ultrasound system) in the style of another image (e.g., a selectable example image in the desired style, such as an image acquired with a different, second imaging modality or an image acquired via a different medical imaging system).

Figure 6:
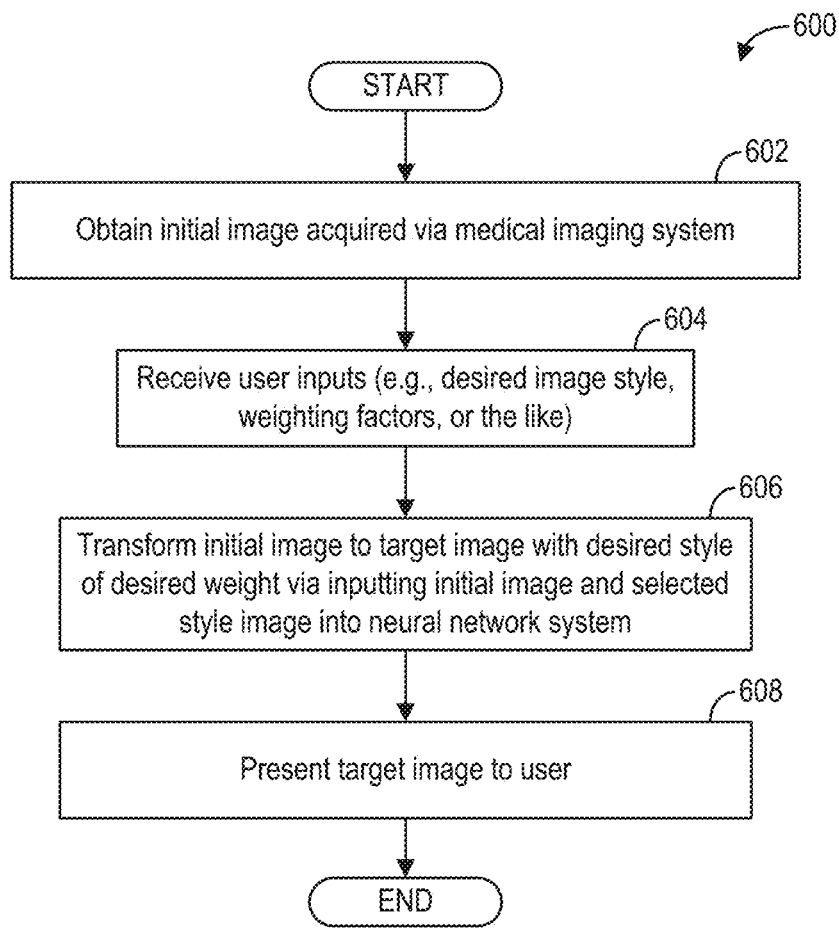
FIG. 6 shows a flow chart of a method for transforming a first image acquired via a first medical imaging system into a second image having the content of the first image presented in a style of a third image not acquired with the first medical imaging system, according to an embodiment.

Turning now to FIG. 6, a method 600 is presented for transforming an initial, first image acquired via a first medical imaging system into a target, second image having the content of the first image presented in a style of a third image not acquired with the first medical imaging system.

Method 600 is described below with regard to the systems and components of FIGS. 1-5, though it should be appreciated that the method 600 may be implemented with other systems and components without departing from the scope of the present disclosure. In some embodiments, method 600 may be implemented as executable instructions in any appropriate combination of the imaging system 100, an edge device connected to the imaging system 100, a cloud in communication with the imaging system, and so on. As one example, method 600 may be implemented in non-transitory memory of a computing device, such as the controller (e.g., processor) of the imaging system 100 in FIG. 1.

Method 600 begins at 602 where an initial image acquired with a medical imaging system (of a certain medical imaging modality) is obtained. In one embodiment, the medical imaging system is an ultrasound imaging system, such as the system 100 shown in FIG. 1. For example, obtaining the initial image may include obtaining an image generated from imaging data acquired during a real-time scanning session with the medical imaging system. As another example, obtaining the initial image may include the processor (e.g., controller) receiving a user input selecting an image stored in memory of the processor or a memory in electronic communication with the processor and, in response, retrieving the selected image from the memory. In this way, the initial image may be acquired in real-time, during a scanning session with the medical imaging system, or from stored data acquired during a previous (e.g., past) scanning session with the (same) medical imaging system.

At 604, the method includes receiving one or more user inputs. The one or more user inputs may be received at the processor from a user input device, such as user input devices 115 and/or touch-sensitive display 117 shown in FIG. 1. The one or more user inputs may include a selection of an exemplary image having a desired image style for the target image (e.g., the style onto which the initial image is desired to be transferred), an uploaded (to the processor by the user) exemplary image having the desired image style for the target image, and/or weighting factors for desired content and style of the target image. An example user interface display showing user selectable elements for setting the style and content and style weighting of the target image is shown.

Figure 7:
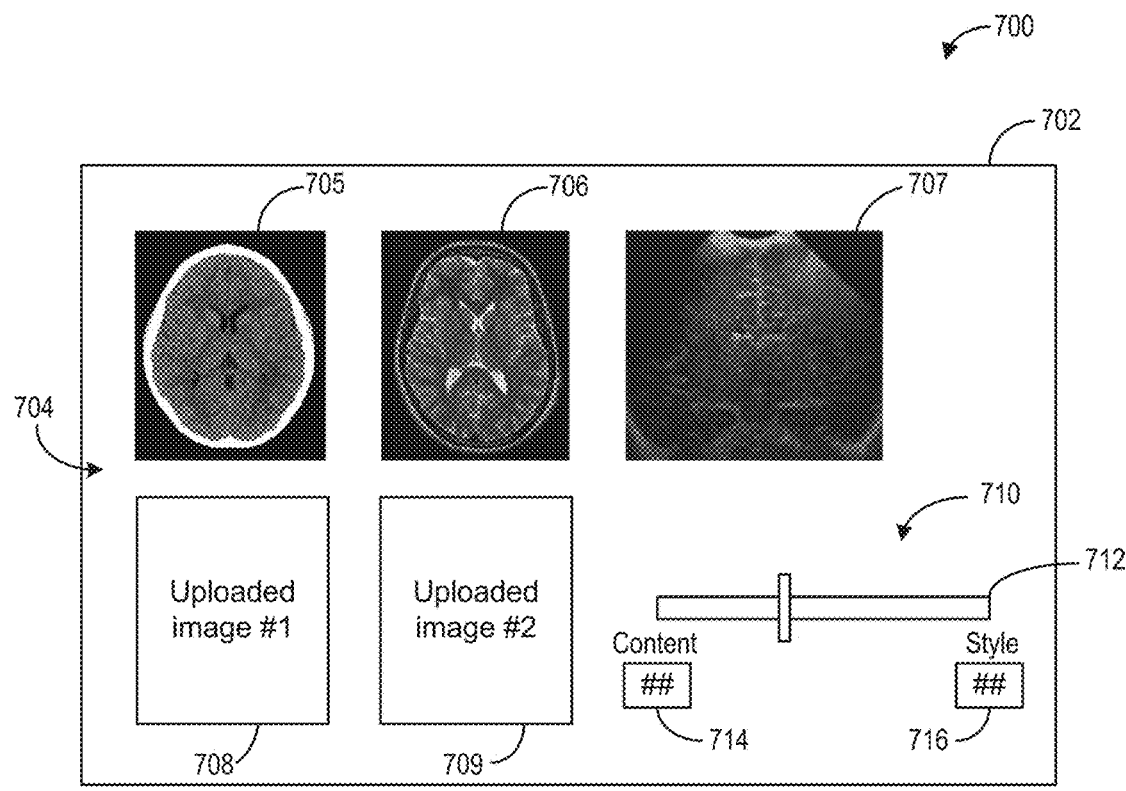
FIG. 7 shows an example user interface display displaying a plurality of selectable example images having different styles, according to an embodiment.

Specifically, FIG. 7 shows a first user interface display 700 of a display device 702. In one example, the display device 702 may be display device 118 shown in FIG. 1. First user interface display 700 includes a display of a plurality of example images 704 having different styles. As described above, the style of the image is defined by the characteristics of the image which may be inherent to the imaging modality (e.g., Mill vs. ultrasound vs. CT), the make/model of the imaging system used to acquire the image, and/or the type of transducer (e.g., ultrasound transducer probe) used to acquire the image. These characteristics may include one or more of a level of smoothness, texture, maps, image boundary, edges, a level of contrast, a noise level, an amount/level of speckle, a resolution level (e.g., low or high), and the like. The displayed example images 704 are selectable via a user (e.g., via touch, a mouse, a keyboard, or the like). In FIG. 7, there are five selectable example images 704 (CT image 705, MM image 706, ultrasound image 707, uploaded image #1 708, and uploaded image #2 709). However, in alternate embodiments, the displayed selectable example images 704 may include a library (e.g., catalog) of example images including more or less than five images (e.g., 4, 10, 20, or 50 images). The library of images may contain images from higher or lower end (e.g., resolution) imaging systems, images from different manufacturer's systems, images from different processing steps of an imaging processing operation of an imaging system, images from different imaging modalities (e.g., x-ray, CT, MM, ultrasound), and the like. The selectable images may be for any anatomy (e.g., brain, heart, fetus, shoulder, or the like). Additionally, a user may upload one or more images, such as images 708 and 709 shown in FIG. 7, to use for the style transfer discussed herein. In one example, the ultrasound image 707 may be an ultrasound image generated from imaging data acquired via a different ultrasound imaging system than the system used to generate the initial image discussed above with reference to FIG. 6. In this way, the example images displayed to a user to select a desired image style of the target image may be images generated from different types of imaging modalities, different makes/models of a system of a same type of imaging modality, images having different resolutions or noise levels, and/or the like.

First user interface display 700 may also include a selectable style/content weighting input 710. In one example, as shown in FIG. 7, the style/content weighting input 710 may include a slideable weighting bar 712 where a relative weighting between 100% emphasis on content and 100% emphasis on style is selectable. Moving the slideable selector of the weighting bar 712 may result in automatic adjustment of a displayed content weighting factor 714 and displayed style weighting factor 716. In some embodiments, the content weighting factor 714 and style weighting factor 716 may be manually set (e.g., numerical values may be typed in) on the first user interface display 700 via input from a user's keyboard or similar device. In this way, a user may select a desired emphasis on content vs. style of the output, target image, where the style is determined from the selected image out of the displayed images 704 and the content is derived from the initial image acquired with the medical imaging system.

Returning to FIG. 6, upon receiving the user inputs at 604, the method continues to 606 to transform the initial image into the target image having the desired style of desired weight via inputting the initial image and the selected style image (e.g., one of images 704 shown in FIG. 7) into the neural network system (e.g., neural network system 408 of FIG. 4 and/or neural network system 500 of FIG. 5). As discussed above, the neural network system may include two neural networks which work together to separate out the content and style of two input images and output a single image that perseveres the content of the initial image while having the style (e.g., visual appearance or characteristics) of the selected style image. In one embodiment, the neural network system may include a convolutional neural network including plurality of convolutional and pooling layers and a feature space (or style representation network) built on top of the convolutional neural network, such as the system described above with reference to FIG. 5.

Below is a description of one embodiment of transforming the initial image to the target image at 606, using a neural network system similar to system 500 described above with reference to FIG. 5. However, it should be noted that in alternate embodiments, the method at 606 may utilize a different neural network system or utilize different combinations of filters, layers (e.g., numbers of layers), and the like, within the neural network system. In the example embodiment, the input, initial image (e.g., the image obtained at 602 and input into the neural network system) may be denoted as p (which may be represented mathematically as a vector or matrix of pixel values). Each layer in the neural network may define a non-linear filter bank with a complexity that increases with the position of the layer in the network (e.g., as the layers become deeper in the network). Thus, a given input image x is encoded in each layer of the convolutional neural network by the filter responses (e.g., features maps) to that image. As an example, each layer with $N_l$ distinct filters has $N_l$ feature maps each of size $M_l$, where $M_l$ is the height times the width of the feature map. Thus, the responses in a layer l can be stored in a matrix:

$$F^l \in R^{N_l \times M_l} \quad \text{(Equation 1)}$$

where is the activation of the $i^{th}$ filter at position j in layer 1. To visualize the image information that is encoded at different layers of the hierarchy a gradient descent may be performed on a white noise image to find another image that matches the feature responses of the original image. Letting p and x be the original, input image and the image that is generated and $P_1$ and $F_1$ their respective feature representations in layer 1, the squared-error loss between the two feature representations is defined as:

$$L_{content}(p, x, l) = \frac{1}{2} \sum_{ij} (F_{ij}^l - P_{ij}^l)^2 \quad \text{(Equation 2)}$$

The derivative of this loss with respect to the activations in layer 1 then equals:

$$\frac{\partial L_{content}}{\partial F_{ij}^l} = \begin{cases} (F^l - P^l)_{ij} & \text{if } F_{ij}^l > 0 \\ 0 & \text{if } F_{ij}^l < 0 \end{cases} \quad \text{(Equation 3)}$$

from which the gradient with respect to the image x can be computed using standard error back-propagation. Thus, the initially random image x is changed until it generates the same response in a certain layer of the convolutional neural network as the original image p.

As explained above, a second neural network including a style representation is built on top of the convolutional neural network responses in each layer of the convolutional neural network. The style representation computes the correlations between the different filter responses, where the expectation is taken over the spatial extent of the input image. These feature correlations are given by the Gram matrix:

$$G^l \in R^{N_l \times N_l} \quad \text{(Equation 4)}$$

where $G_{ij}^l$ is the inner produce between the vectorized feature map i and j in layer 1:

$$G_{ij}^l = \sum_k F_{ik}^l F_{jk}^l \quad \text{(Equation 5)}$$

To generate a texture that matches the style of a given image, a gradient descent from a white noise image is used to find another image that matches the style representation of the original image. This may be done by minimizing the mean-squared distance between the entries of the Gram matrix from the original image and the Gram matrix of the image to be generated. So, let a and x be the original image and the image that is generated and $A^1$ and $G^1$ their respective style representations in layer 1. The contribution of that layer to the total loss is then:

$$E_l = \frac{1}{4 N_l^2 M_l^2} \sum_{ij} (G_{ij}^l - A_{ij}^l)^2 \quad \text{(Equation 6)}$$

and the total loss is:

$$L_{style}(a,x) = \sum_{l=0}^{L} w_l E_l \quad \text{(Equation 7)}$$

where $w_1$ are weighting factors of the contribution of each layer to the total loss. The derivative of $E_1$ with respect to the activations in layer 1 can be computed analytically by:

$$\frac{\partial E_l}{\partial F_{ij}^l} = \begin{cases} \frac{1}{N_l^2 M_l^2} ((F^l)^T (G^l - A^l))_{ji} & \text{if } F_{ij}^l > 0 \\ 0 & \text{if } F_{ij}^l < 0 \end{cases} \quad \text{(Equation 8)}$$

The gradients of $E_1$ with respect to the activations in lower layers of the network can be readily computed using standard error back-propagation. To generate the images that mix the content of the initial image acquired via the medical imaging system with the style of the selected style image in the desired image style (selected at 604), the distance of a white noise image is jointly minimized from the content representation of the initial image in one layer of the network and the style representation of the selected style image in a number of layers of the convolutional neural network. So, let p be the initial image acquired with the medical imaging system and a be the selected style image. The loss function that is minimized is defined as:

$$L_{total}(p,a,x) = \alpha L_{content}(p,x) + \beta L_{style}(a,x) \quad \text{(Equation 9)}$$

where $\alpha$ and $\beta$ are the weighting factors for content and style reconstruction, respectively. For example, by increasing $\alpha$ and/or decreasing $\beta$, the emphasis on style of the final output, target image may be reduced. The weighting factors may be selected by the user and set by the processor, based on the user selection, as discussed above at 604. By more heavily weighting the style weighting factor (e.g., $\beta$), the output image may more heavily resemble the visual appearance and characteristics of the selected style image. However, since the output, target image may be used for medical diagnosis, there may be a pre-set limit for the weighting factors to ensure the physiological content of the initial image is persevered in the output image. In this way, the method at 606 may include minimizing the loss function (e.g., the loss equation of equation 9) during synthesis of the target image and, in response to receiving a selection of the two weighting factors at 604, adjusting an emphasis of the content and visual characteristics (e.g., style) represented in the synthesized target image, based on the selected two weighting factors (e.g., a and (3).

Figure 8:
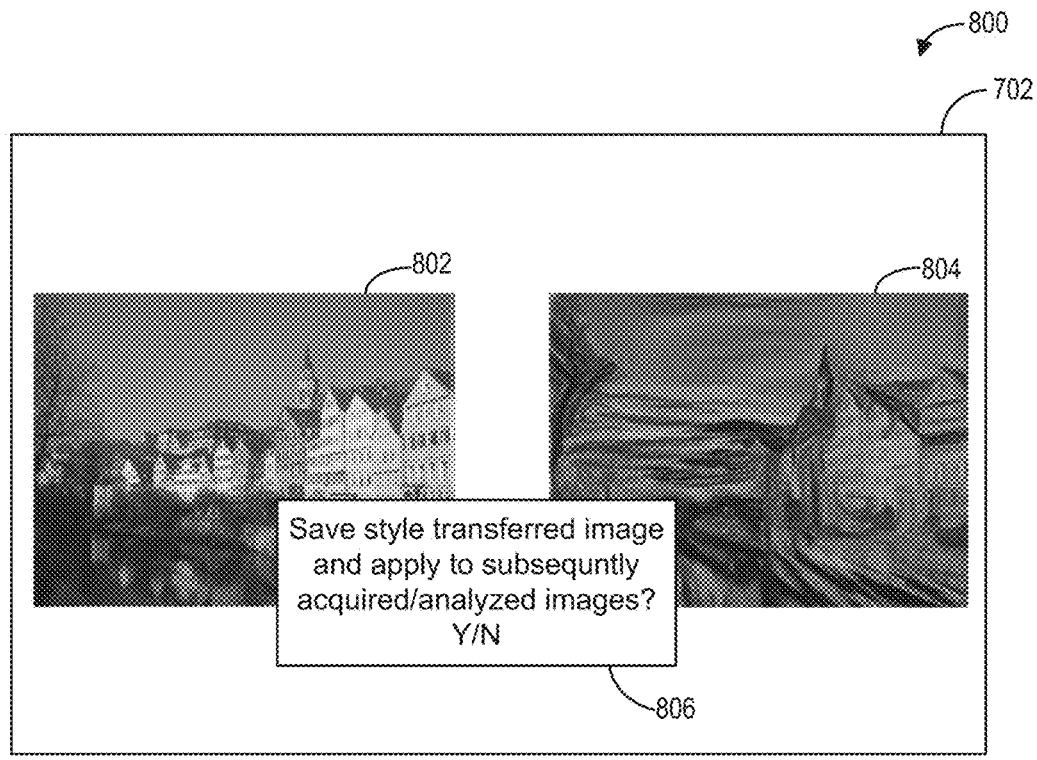
FIG. 8 shows an example user interface display including a side-by-side display of an initial image and a target image resulting from transforming the style of the initial image via a neural network system, according to an embodiment.

Returning to FIG. 6, at 608, the target image output by the neural network system (determined at 606) is then presented (e.g., output) to a user. In one example, presenting the output, target image (which is in the desired style) includes outputting the target image to a display device for display to a user. In another example, presenting the output, target image additionally or alternatively includes saving the output, target image to a memory of the processor or in electronic communication with the processor. In some examples, the display device may be a display device of the medical image system used to acquire the initial image or another display device in electronic communication with the processor, such as a portable electronic device used by a healthcare provider. FIG. 8 shows an example user interface used to display the target image to the user.

Specifically, FIG. 8 shows a second user interface display 800 of the display device 702. Second user interface display 800 includes a side-by-side display of the initial image 802 (photograph shown in FIG. 8 is by way of an example, in actual application the initial image 802 may be an ultrasound image) and the target, output image 804 (e.g., the style transferred image having the style of the selected style image and content of the initial image 802). Thus, a user may visualize both the initial image 802 and the output image 804 in the desired, selected image style and decide whether to store and/or use the output image 804 for diagnosis and for subsequently acquired or analyzed (e.g., during future scanning sessions) images. For example, as shown in FIG. 8, the user interface display 800 may display a dialog box 806 prompting the user as to whether they want to save the style transferred image (output image 804) or not. In some embodiments, the second user interface display 800 may additionally display the selected style image used to transform the initial image 802 into the desired style. In one embodiment, the second user interface display 800 may additionally display the selectable style/content weighting input 710 of FIG. 7 to allow the user to adjust the settings of the style transformation. This adjustment may result in generating an updated output image based on the updated weighting input and displaying the updated output image via the second user interface display.

In this way, in one embodiment, the method 600 provides a method for transforming an initial image acquired with a medical imaging system (e.g., an ultrasound image) into a different style image by applying two neural networks: a first neural network that captures the content of the original image and a second neural network that captures the style into which the original image should be transferred. By converging these two neural networks, the output is an image that contains the content (e.g., physiological details) of the originally acquired image but has the style (e.g., visual appearance and characteristics) of the image selected to represent the desired style.

In some embodiments, the method described above for transforming images may be used to obtain sets of images for training a deep neural network. For example, as introduced above, for deep learning training of neural networks (such as network 200 of FIG. 2), two images of different resolution and/or noise levels, where one has the appearance of a medical imaging image (e.g., an ultrasound image), are used to train the neural network to convert images acquired with a medical imaging system to images having higher resolution and/or less noise. For example, photographs (which are not generated from data acquired by a medical imaging system) may have higher resolution and less noise than images generated from data acquired by a medical imaging system. Thus, a photograph and a corresponding image transformed (using the method of FIG. 6) from the photograph having a style of an image acquired with a medical imaging modality (e.g., an ultrasound system) may be used to train a neural network to map lower resolution images (e.g., images acquired via a medical imaging system) to higher resolution images (e.g., images having the same content and imaging modality style as the lower resolution images, but having higher resolution and/or less noise).

Figure 9:
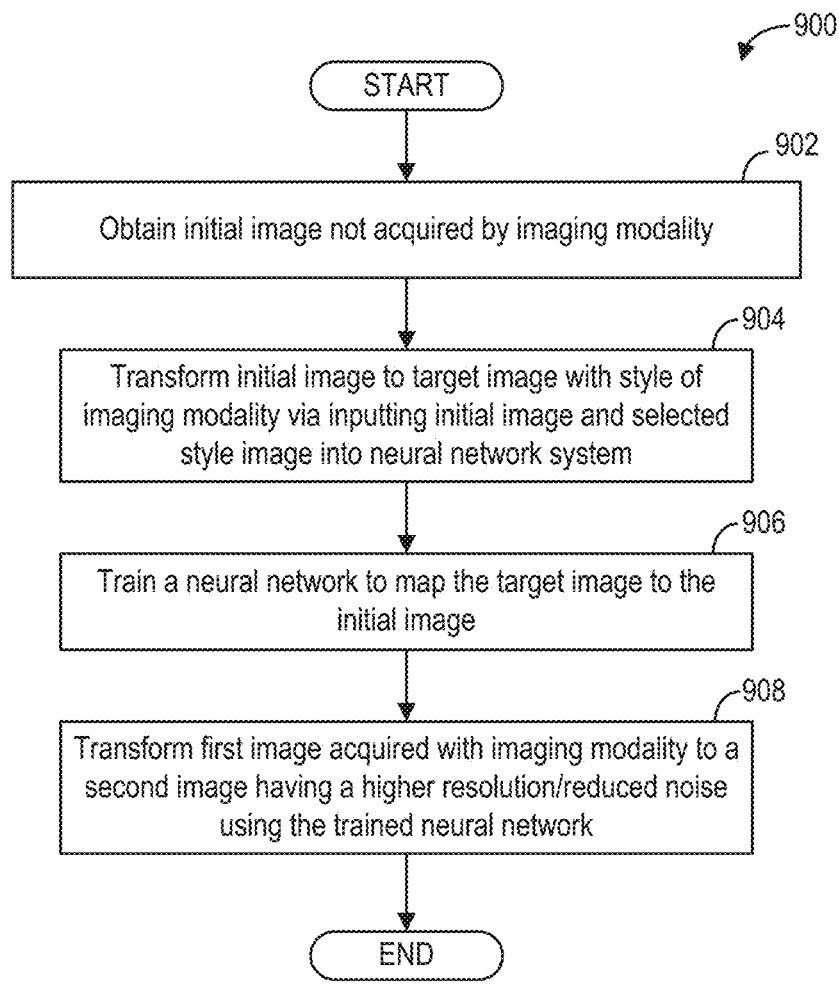
FIG. 9 a flow chart of a method for training a deep neural network using sets of images obtained via applying style transfer with a neural network system, according to an embodiment.

FIG. 9 shows an example method 900 for training a deep neural network using sets of images obtained via applying style transfer with a neural network system. In one example, the deep neural network to be trained may resemble the neural network 200 of FIG. 2. In another example, the neural network system for obtaining the sets of images for training the neural network may be similar to the neural network systems shown in FIGS. 4 and 5. Method 900 is described below with regard to the systems, components, and methods of FIGS. 1-8, though it should be appreciated that the method 900 may be implemented with other systems and components without departing from the scope of the present disclosure. In some embodiments, method 900 may be implemented as executable instructions in any appropriate combination of the imaging system 100 of FIG. 1, an edge device connected to the imaging system 100, a cloud in communication with the imaging system, and so on. As one example, method 900 may be implemented in non-transitory memory of a computing device, such as the controller (e.g., processor) of the imaging system 100 in FIG. 1.

Method 900 begins at 902 by obtaining an initial image (or images) not acquired by an imaging modality (e.g., not generated from image data acquired by a medical imaging system). In one example, the initial image may be a photograph uploaded to the processor via a user. In another example, the initial image may be selected from a catalog of photographs stored in memory of the processor or a memory of a device in electronic communication with the processor. The photographs may be digital photographs obtained with a digital camera. For example, the initial image(s) may be in a digital photographic format, such as red-green-blue (RGB), cyan-magenta-yellow-black (CMYB), hue saturation brightness (HSB), grayscale, etc.

At 904, the method includes transforming the initial image (or images) into a target image with a style of a medical imaging modality (e.g., CT, MRI, ultrasound, or the like) via inputting the initial image and a selected style image representing the style (e.g., visual appearance and characteristic) of the medical imaging modality into a neural network system. For example, the method at 904 may proceed according to the method at 606 of FIG. 6, as described above, using the initial image not acquired by the imaging modality and the selected style image as inputs. The selected style image may be selected via a user from a catalog of images or from an uploaded image, similarly to as described above with reference to the method at 604 in FIG. 6. For example, for training a deep neural network to process ultrasound images, the initial image(s) are transformed into corresponding ultrasound images(s) having the style of a selected example ultrasound image and the content of the initial image(s), following the method 600 of FIG. 6. The output, target image may then be an image that was not generated from data acquired by an ultrasound imaging system, but has the style (e.g., visual appearance and characteristics) of an ultrasound image that was generated from data acquired by an ultrasound imaging system. Further, the target image may preserve the content of the initial image. In this way, neither the initial image nor the output, target image have medical/physiological content, but since the target image has the appearance of a medical ultrasound image, the initial image and target image may be used to train a deep neural network, as described further below.

Method 900 proceeds to 906 to train a deep neural network with the corresponding initial image(s) and target image(s) obtained at 904. For example, a deep neural network, such as the deep neural network 200 of FIG. 2, is trained to map the target image output from the neural network system at 904 to the initial image obtained at 902, such that the deep neural network learns a mapping from a nosier/lower resolution image to an image having reduced noise and/or higher resolution. As one illustrative and non-limiting example, the method at 906 may specifically utilize backpropagation to calculate and adjust weights of the deep neural network 200 to learn the mapping between the initial image and target image.

After training the deep neural network at 906, the method continues to 908 to transform a first image acquired with an imaging modality (e.g., an ultrasound imaging system) to a second image having a higher resolution/reduced noise using the trained neural network. In this way, the trained deep neural network may be used to post-process medical images acquired by a medical imaging system. The method at 908 may further include outputting (e.g., outputting for display via a display device) the transformed, second image.

In this way, a system of deep neural networks may be used to transform a style of an initial image into a target image having a style of a different, example image, while still preserving the content of the initial image. For example, a first image acquired via a medical imaging system (e.g., ultrasound image) may be transformed into a second image that includes the physiological content of the first image, while having a style (different than the first image) of an example, third image. The style of the images may be defined as the visual appearance and characteristics of an image. For example, medical images obtained from a medical imaging system may have certain visual characteristics that are pre-defined based on the type of imaging modality (e.g., MM, CT, ultrasound, and the like), based on the hardware used to acquire the image data (e.g., the type of ultrasound transducer), and based on programming of the medical imaging system. As described above, there is no easy way to transfer acquired medical images from one style (e.g., imaging modality/type) to another style (e.g., imaging modality/type). Such a transformation is not just a traditional modeling transformation, but requires significant reprogramming of the imaging system used to require the images since the style of a generated image is inherent to the programming of the system, the imaging modality of the system, and/or the components of the system used to acquire data used to generate the images (e.g., ultrasound probes). By using the neural network system to transform an image acquired from the medical imaging system into a different style, a user may obtain an image having a desired style without having to re-program the medical imaging system (which may take significant time, money, and effort) or having to re-acquire the image via a different imaging modality of a different medical imaging system. Further, by preserving the content of the original image using the system of neural networks, the image in the new style may still be used for medical diagnosis. Thus, the technical effect of transforming a first image acquired via a medical imaging system into a second image based on visual characteristics of a third image using a system of deep neural networks configured to separate visual characteristics from content of an image, where the second image includes a content of the first image and the visual characteristics of the third image and the first and second images have different visual characteristics and presenting the transformed second image to a user, is obtaining an image for diagnosis in a desired style, without having to repeat the acquisition of the image with a different imaging system producing images in the desired style or completely reprogram the current imaging system. In this way, significant time, effort, and money may be saved while allowing the user to obtain medical images of a desired style which may be used for diagnosis.

As one embodiment, a method includes transforming a first image acquired via a medical imaging system into a second image based on visual characteristics of a third image using a system of deep neural networks configured to separate visual characteristics from content of an image, where the second image includes a content of the first image and the visual characteristics of the third image and the first image and second image have different visual characteristics; and presenting the transformed second image to a user. In a first example of the method, the visual characteristics are pre-defined by an image processing programming and type of imaging modality of the medical imaging system. A second example of the method optionally includes the first example and further includes, wherein the transforming the first image includes inputting each of the first image and the third image into the system of deep neural networks and outputting the second image from the system of deep neural networks. A third example of the method optionally includes one or more of the first and second examples and further includes, wherein the system of deep neural networks includes a first deep neural network configured to capture the content of the first image and a second deep neural network configured to capture the visual characteristics of the third image and wherein the transforming includes converging outputs of the first deep neural network and the second deep neural network to synthesize the second image. A fourth example of the method optionally includes one or more of the first through third examples and further includes, wherein the transforming further includes minimizing a loss function containing two weighting factors, one for content and one for visual characteristics, during synthesis of the second image and further comprising, in response to receiving a selection of the two weighting factors, adjusting an emphasis of the content and visual characteristics represented in the synthesized second image, based on the selected two weighting factors. A fifth example of the method optionally includes one or more of the first through fourth examples and further includes, wherein the first neural network is a convolutional neural network comprising a plurality of layers, where each layer includes a collection of image filters configured to extract features from the input image and output a plurality of feature maps, each feature map of a single layer being a differently filtered version of the input image. A sixth example of the method optionally includes one or more of the first through fifth examples and further includes, wherein the second neural network is built on top of the feature maps of the first neural network and is configured to perform correlations between the plurality of feature maps in the plurality of layers of the first neural network. A seventh example of the method optionally includes one or more of the first through sixth examples and further includes, wherein the medical imaging system is an ultrasound imaging system. An eighth example of the method optionally includes one or more of the first through seventh examples and further includes generating the first image via image data acquired with the ultrasound imaging system. A ninth example of the method optionally includes one or more of the first through eighth examples and further includes, wherein presenting the transformed second image includes displaying the transformed second image via a display device in electronic communication with a processor performing the transforming. A tenth example of the method optionally includes one or more of the first through ninth examples and further includes, wherein displaying the transformed second image includes displaying the transformed second image and the first image, concurrently, on a same user interface display of the display device. An eleventh example of the method optionally includes one or more of the first through tenth examples and further includes displaying a plurality of example style images having different visual characteristics, the plurality of example style images including the third image, via the display device and receiving a selection of the third image via a user interface in electronic communication with the processor.

As another embodiment, a method of training a deep neural network includes transforming an initial image not acquired by a medical imaging modality into a target image via a system of neural networks configured to separate visual characteristics from content of an image, the target image having a format and visual characteristics specific to the medical imaging modality, the initial image having a higher resolution than the target image; training the deep neural network to map the target image the initial image; and transforming a first image acquired with a medical imaging system of the medical imaging modality to a second image having the higher resolution of the initial image using the trained deep neural network. In a first example of the method, the initial image is a digital photograph. A second example of the method optionally includes the first example and further includes, wherein the medical imaging modality is ultrasound and the first image is generated from imaging data acquired with an ultrasound imaging system. A third example of the method optionally includes one or more of the first and second examples and further includes, wherein transforming the initial image includes inputting each of the initial image and an example image having the format and visual characteristics specific to the medical imaging modality and acquired with the medical imaging system into the system of neural networks, the system of neural networks including two neural networks configured to generate an image having the format and visual characteristics of the example image and content of the initial image As yet another embodiment, a system includes a memory storing a deep neural network system including two deep neural networks; and a processor communicably coupled to the memory and configured to: transform an initial image acquired by a medical imaging system into a target image via inputting the initial image and a selected style image into the deep neural network system, the target image having a same style, defined by visual characteristics of the selected style image, as the selected style image and a content of the initial image, the style of the selected style image different than a style of the initial image. In a first example of the system, the processor is a processor of the medical imaging system and wherein the transforming is performed in real-time, during a medical imaging session. A second example of the system optionally includes the first example and further includes, wherein the first neural network is a convolutional neural network configured to recognize and separate the content of the initial image from visual characteristics of the initial image and wherein the second neural network is built on top of the first neural network and configured to perform correlations in order to separate the visual characteristics from the selected style image from the content of the selected style image. A third example of the system optionally includes one or more of the first and second examples and further includes, wherein the visual characteristics include one or more of a level of smoothness, texture, maps, size, shape, and/or color of image boundaries, smoothness of feature edges, a level of contrast, a noise level, an amount of speckle, and a resolution level and wherein the visual characteristics are pre-determined according to an imaging modality and imaging processing programming of a system used to acquire the selected style image.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
transforming a first image with content comprising physiological details acquired via a first medical imaging system into a second image based on a style of a third image, where the style of the third image includes a visual appearance and characteristics of the third image, the transformation from the first image to the second image using a system of deep neural networks configured to separate visual appearance and characteristics from content of an image, where the second image includes the content of the first image and the visual appearance and characteristics of the third image, where visual appearance and characteristics for the first image and visual appearance and characteristics for the second image are different, where the visual appearance and characteristics of the first image are a medical style of the first medical imaging system, and where the visual appearance and characteristics of the second image and the third image are a different medical style of a second medical imaging system; and
presenting the transformed second image to a user.

2. The method of claim 1, wherein the visual appearance and characteristics of the third image are pre-defined by an image processing programming and type of imaging modality of the second medical imaging system.

3. The method of claim 1, wherein the transforming the first image includes inputting each of the first image and the third image into the system of deep neural networks and outputting the second image from the system of deep neural networks.

4. The method of claim 1, wherein the system of deep neural networks includes a first deep neural network configured to capture the content of the first image and a second deep neural network configured to capture the visual appearance and characteristics of the third image and wherein the transforming includes converging outputs of the first deep neural network and the second deep neural network to synthesize the second image.

5. The method of claim 4, wherein the transforming further includes minimizing a loss function containing two weighting factors, one for content and one for visual characteristics, during synthesis of the second image and further comprising, in response to receiving a selection of the two weighting factors, adjusting an emphasis of the content and visual characteristics represented in the synthesized second image, based on the selected two weighting factors.

6. The method of claim 4, wherein the first neural network is a convolutional neural network comprising a plurality of layers, where each layer includes a collection of image filters configured to extract features from the input image and output a plurality of feature maps, each feature map of a single layer being a differently filtered version of the input image.

7. The method of claim 6, wherein the second neural network is built on top of the feature maps of the first neural network and is configured to perform correlations between the plurality of feature maps in the plurality of layers of the first neural network.

8. The method of claim 1, wherein the first medical imaging system is an ultrasound imaging system.

9. The method of claim 1, wherein the first medical imaging system and the second medical imaging system are both ultrasound systems.

10. The method of claim 1, wherein the first medical imaging system and the second medical imaging system are different imaging modalities.

11. The method of claim 1, wherein there is a pre-set limit for weighting a factor for the content of the first image and a factor for the style of the third image in transforming the first image to the second image.

12. The method of claim 10, further comprising displaying a plurality of example style images having different visual characteristics, the plurality of example style images including the third image, via the display device and receiving a selection of the third image via a user interface in electronic communication with the processor.

13. A method of training a deep neural network, the method comprising:
transforming an initial image into a target diagnostic image via a system of neural networks configured to separate visual characteristics from content of an image, the target diagnostic image having a format and visual characteristics specific to a medical imaging modality, the initial image having a style that is a higher resolution than the target diagnostic image, and wherein the initial image is not acquired by a medical imaging apparatus;
training the deep neural network to map the target diagnostic image to the initial image; and
transforming a first image comprising physiological content acquired with a medical imaging system of the medical imaging modality to a second image having the physiological content of the first image and the higher resolution that is the style of the initial image using the trained deep neural network,
wherein there is a pre-set limit for weighting a factor for the content of the first image and a factor for the style of the initial image in transforming the first image to the second image.

14. The method of claim 13, wherein the initial image is a digital photograph.

15. The method of claim 13, wherein the medical imaging modality is ultrasound and the first image is generated from imaging data acquired with an ultrasound imaging system.

16. The method of claim 13, wherein transforming the initial image includes inputting each of the initial image and an example image having the format and visual characteristics specific to the medical imaging modality and acquired with the medical imaging system into the system of neural networks, the system of neural networks including two neural networks configured to generate an image having the format and visual characteristics of the example image and content of the initial image.

17. A system, comprising:
a memory storing a deep neural network system including two deep neural networks; and
a processor communicably coupled to the memory and configured to:
transform an initial image acquired by a medical imaging system into a target image via inputting the initial image and a selected style image into the deep neural network system, the target image having a same style, defined by visual characteristics of the selected style image, as the selected style image and a content of the initial image acquired by the medical imaging system, the style of the selected style image having a medical imaging style that is a different medical style than a medical style of the initial image, wherein there is a pre-set limit for weighting a factor for the content of the initial image and a factor for the style of the selected style image in the target image.

18. The system of claim 17, wherein the processor is a processor of the medical imaging system and wherein the transforming is performed in real-time, during a medical imaging session.

19. The system of claim 17, wherein the first neural network is a convolutional neural network configured to recognize and separate the content of the initial image from visual characteristics of the initial image and wherein the second neural network is built on top of the first neural network and configured to perform correlations in order to separate the visual characteristics from the selected style image from the content of the selected style image.

20. The system of claim 17, wherein the initial image comprises physiological content, and wherein the pre-set limit preserves the physiological content of the initial image.

* * * * *